Feb. 1, 1949.  J. H. V. FINNEY  2,460,280
FILTER DISK SEGMENT

Filed Oct. 22, 1943  2 Sheets—Sheet 1

JOHN H. V. FINNEY
INVENTOR.

BY *A. A. McGrew*
ATTORNEY

Feb. 1, 1949. J. H. V. FINNEY 2,460,280
FILTER DISK SEGMENT
Filed Oct. 22, 1943 2 Sheets-Sheet 2

JOHN H. V. FINNEY
INVENTOR.

BY *[signature]*
ATTORNEY

Patented Feb. 1, 1949

2,460,280

UNITED STATES PATENT OFFICE 2,460,280

FILTER DISK SEGMENT

John H. V. Finney, Denver, Colo., assignor to Mining Process and Patent Company, Denver, Colo., a corporation of Delaware Application October 22, 1943, Serial No. 507,256

7 Claims. (Cl. 210—201)

This invention relates to filters, by which suspended matter or the like is removed from fluent matter, such as a mixture of solids and liquids, through vacuum and pressure influences. The principles of this invention are particularly applicable to disc-type filters, which comprise one or more discs mounted vertically on a horizontal shaft with the lower portion of each moving through a body of fluent matter. However, the principles of this invention are also applicable to drum-type filters, which comprise a drum rotatable about a horizontal axis with the lower portion immersed in a body of fluent matter.

Filters are used in many industrial processes, such as in chemical processes to remove a chemical precipitate, or in ore milling to remove mineral particles from the liquid employed in separating the mineral from waste rock or other undesirable matter, as in a froth flotation apparatus.

Both disc- and drum-type filters are normally divided into sections, and a filtering medium, such as cloth, is mounted on each section and sealed at its ends. Vacuum influences are produced beneath the filtering cloth as each section moves through the body of fluent matter, so that filtrate will be drawn through the cloth and suspended matter deposited as a cake upon the surface of the cloth. If desired, after the section has moved out of the body of fluent matter, the deposited cake may be washed by sprays of water or the like, and the wash water drawn through the cake and also through the filtering cloth by a vacuum influence. Further along in the movement of the section, pressure influences may be introduced beneath the filtering cloth to cause the cake to become loosened, and at the same time, a pointed scraping device may be employed to separate the cake from the surface of the filtering cloth.

If filtrate and/or washing liquid remains in a section at the beginning of or during the removal operation, such liquid is blown back into the cake, and the very purpose of the filtering operation—to reduce as much as possible the fluid or liquid content of the cake—is thereby defeated. Thus, it is important that all of the filtrate and/or wash liquid pulled through the cake into a filter section be removed before blowback as far as possible.

Wear upon the filtering medium surface or cloth is relatively great, and the problem of replacing filter cloth readily and easily is of considerable moment. Ready accessibility and convenience of repair and replacement of the parts of the filter are also highly desirable.

Among the objects of this invention are to provide an improved filter construction in which the removal of substantially all the filtrate and/or washing liquid is assured before a section passes again into the body of fluent matter; to provide a filter in which drainage of the filtrate and/or washing liquid to one boundary of the filter section is insured; to provide an improved disc-type filter in which adequate drainage of each section is insured; to provide a disc-type filter in which the filtering medium may be replaced with rapidity and relative ease; to provide a disc-type filter in which vacuum pressure effects are produced from one side of a segment or section; to provide such a disc-type filter in which the vacuum and pressure effects may be produced through a support for a drainage block; to provide a disc-type filter in which the vacuum and pressure effects are adequately transmitted to a plurality of discs; to provide such a disc-type filter in which any desired number of discs may be utilized; to provide such a disc-type filter in which worn parts may be readily replaced; to provide such a disc-type filter in which an adequate connection between a valve device and the disc sections is assured; to provide such a filter in which there is assured a relatively quick flow to and through the vacuum connection at the beginning of the filtering operation, when a section enters the body of fluent matter; and to provide other features, which, along with the details of construction of a preferred embodiment of this invention, will be apparent from the description which follows.

In general, a filter constructed in accordance with this invention is provided with a plurality of sections—longitudinal sections in the case of a drum-type filter, and segmental sections in the case of a disc-type filter—and each section includes a filtering medium, such as cloth, covering means therebeneath for draining fluid generally downwardly toward a boundary of the section, as the section is moved generally downwardly. Such drainage means may comprise a block or the like for supporting the filtering medium and provided with a plurality of parallel grooves which insure that the drainage path will be in the direction desired. In addition, means such as a perforated pipe is provided along the boundary to which the fluid is drained, and this pipe may comprise a support for the groove-containing block. In a disc-type filter, a cloth bag or the like preferably covers the block and the pipe down to the lower end of the block.

In further accordance with this invention, a disc-type filter may comprise a plurality of hubs having radially spaced holes into which valve connection pipes fit and also having apertures therethrough connecting the disc section with one of such holes. Pipes preferably connect the holes in one hub with the holes in the hubs at either side thereof, with the holes in the last hub at one end being connected with ports in a valve mechanism, and the holes in the hub at the opposite end being plugged on the outside. The direct connection between the valve and each section of each disc insures the prompt and effective application of vacuum or pressure whenever provided by the valve.

Other features and details of construction will become apparent from the following description and accompanying drawings, in which.

Figure 1:
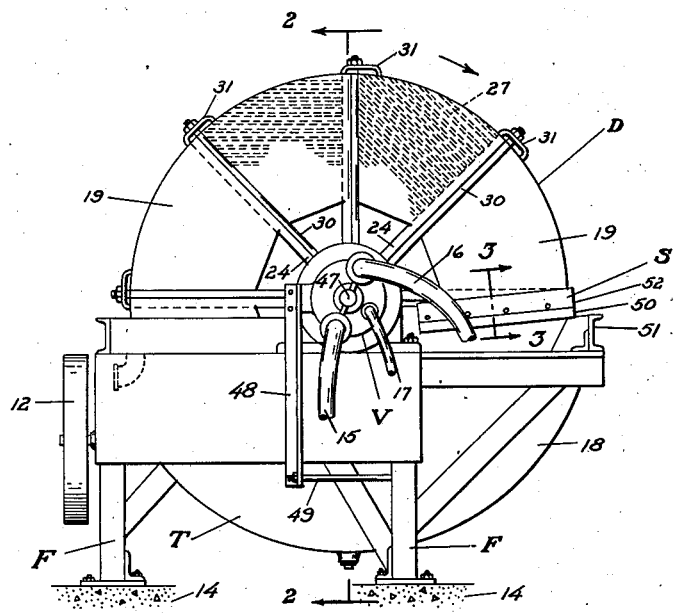
Fig. 1 is an end elevation of a disc-type filter embodying this invention.
Figure 2:
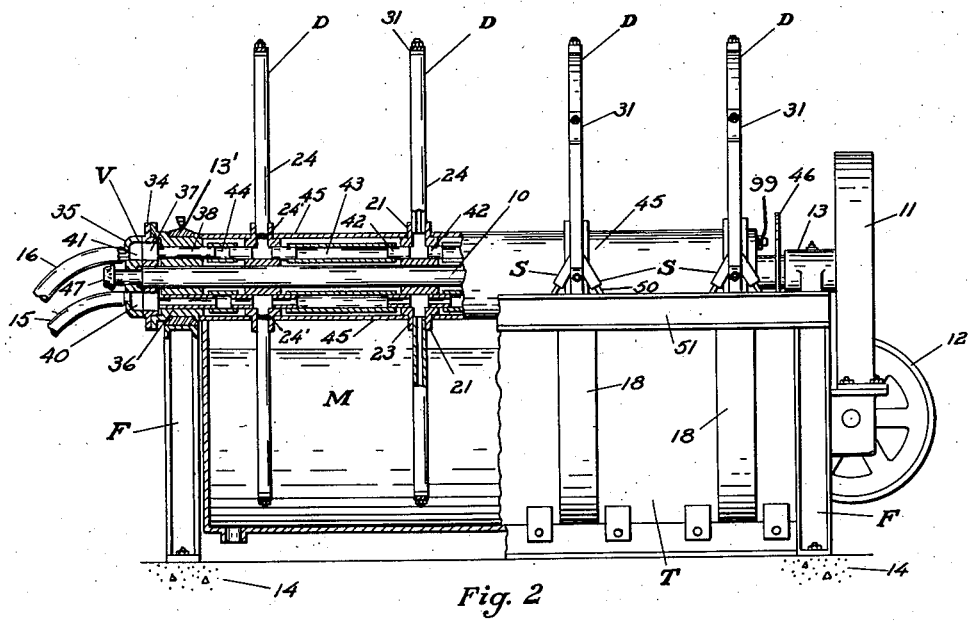
Fig. 2 is a front elevation of the filter, partially in section taken along the line 2—2 of Fig. 1.

As illustrated in Figs. 1 and 2, a disc-type filter embodying this invention may include a plurality of discs D mounted upon and rotated by a shaft 10, through suitable gearing disposed in a housing 11, and driven through a pulley 12. The shaft 10 is rotatable in bearings 13 and 13', disposed at the ends of a tank T similar in construction to the tank shown in Fig. 7 of Genter Patent 1,538,980. The tank T contains a body of fluent matter M, in which the lower portion of each disc is immersed and the tank is supported by a framework F mounted upon and secured to a suitable floor or foundation 14. At the opposite end of the shaft from the driving means is a valve V, adapted to control the pressure and vacuum influences supplied thereto by vacuum or suction hoses 15 and 16 and an air hose 17.

The front portion of tank T is quadri-cylindrical in section, while the rear portion of tank T comprises a plurality of rearwardly extending quadri-cylindrical pans 18, one for each disc.

Each disc is divided into a plurality of sections or segments—eight as shown, although any other desired number may be used—and each section is covered with a filtering medium or cloth 19. The discs are rotated in the direction of the arrow of Fig. 1, and as each section passes through the body of fluent matter M, vacuum influences are introduced beneath the filtering cloth through hose 15, to cause filtrate to be drawn into the section and suspended matter to be deposited upon the surface of the filtering cloth in the form of a cake. As the disc rotates further, and the section moves out of the filtering medium, the vacuum or suction may be maintained in order to draw as much filtrate as possible from the cake. As the section reaches a point along the upper periphery of the disc, such as a top vertical position, a suitable washing liquid or fluid, such as water, may be sprayed thereon by suitable means, not shown, such as spray pipes, and a higher vacuum introduced through hose 16, to draw the wash water and/or any remaining filtrate from the section. Just before, and/or during, and/or just after, engagement of the filtering cloth with a scraping device S, which removes the deposited cake, air under pressure may be introduced beneath the filtering cloth by hose 17. This tends to loosen the cake prior to and/or during scraping, to blow off any cake particles remaining, and to blow out moisture remaining in the pores of the cloth.

Figures 3, 4:
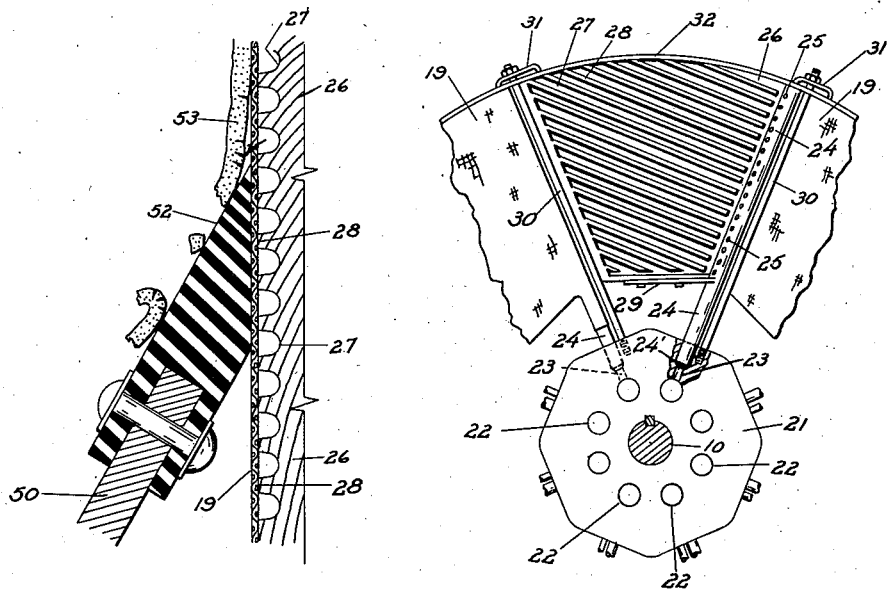
Fig. 3 is an enlarged fragmentary section, illustrating the action of a scraping device provided in accordance with this invention.
Fig. 4 is a partial vertical sectional view of a disc of the apparatus of Figs. 1 and 2.

As illustrated in Figs. 2 and 4, each disc may comprise a hub 21, attached to the shaft in any suitable manner as by a key, and provided with a plurality of radially spaced holes or apertures 22 extending therethrough. Extending radially outwardly from each hole 22 is a drilling or aperture 23 into which the lower end of a pipe 24 extends. This pipe is provided with a plurality of holes or slots 25, on the trailing side, taken with respect to the direction of rotation of the disc, so that as the section moves generally downwardly from its uppermost position the drain holes in the pipe, which are along one side or boundary of the section, will be at the lower side of the section. To insure that all of the filtrate and/or washing liquid in the section will drain quickly into the pipe, so that the section will be free of liquid when it enters the body of fluent matter upon further downward movement, a segmental block 26 is provided with grooves 27 which are disposed in parallel relation and extend perpendicularly to the pipe 24, or lower boundary of the section during downward movement. The grooves 27 occupy a majority of the peripheral surface of the block, on either side thereof, as in Fig. 3, and the lands 28 between the grooves provide support for the filtering cloth. As is evident from Fig. 4, the grooves 27 open solely at the leading ends thereof into the drainage space formed adjacent pipe 24, which also drains liquid from the section or sector along the leading edge only.

Effective drainage of the liquid from the section, before blowback and before the section enters the body of fluent matter, is an important feature of this invention. Liquid blown back into the cake represents wasted effort. Also the efficient and quick deposition of cake is dependent upon a relatively strong suction or vacuum effect produced through the pores of the filtering cloth as the section initially enters the body of fluent matter, or at the instant the vacuum is first produced while the section is within the body of fluent matter. The exact reason for this is not definitely known, but it is believed that, particularly when the fluent matter contains particles varying in size, the larger particles as well as the smaller particles must be quickly attracted to the filtering surface, or else the smaller particles tend to form a relatively dense cake which reduces the vacuum effect and therefore reduces the velocity at which the larger particles will move toward the filtering surface. When the initial cake deposited consists of both larger and smaller particles, the vacuum influence exerted through the initial cake is more readily felt within the body of fluent matter, and other larger particles as well as the smaller particles, are moved toward the filtering surface relatively quickly. However, if the smaller particles are initially deposited upon the filtering surface in preference to the larger particles, due to a weak initial vacuum effect, then a denser cake is formed which may not permit sufficient vacuum influence to be felt through the same to cause the larger particles to move toward the cake with sufficient rapidity to provide an even deposition. Thus, a cake consisting of substantially smaller particles will build up but will soon clog the filtering surface and thereby preclude the possibility of depositing any greater depth of cake. However, if an even deposition from the standpoint of smaller and larger particles is initially secured, the vacuum effect will be effective throughout the passage of the section through the body of fluent matter. Thus, the particle sizes in the removed cake will correspond to the concentration of solid in the fluent matter, both in the body and in the incoming fluent matter.

A further important result of the construction shown, lies in the fact that substantially all of the removed liquid is drained effectively from each section before the air pressure is turned on, so that little or no liquid will be blown back into the cake prior to removal by the scraping device S. This is a distinct advantage, particularly over constructions in which the liquid is removed from the center of the lower portion of the disc sector or section, and also those constructions in which the liquid is removed simultaneously from both the leading and trailing edges of the sector. When the liquid is removed by a pipe or the like attached to the center of the lower end of the sector, there will be an accumulation of liquid in the space at the lower end of the sector, beneath the pipe connection, as the sector moves downwardly. Also, when liquid is removed from both the leading and trailing edges, liquid will tend to remain in the sector due to a reversal of flow in the sector caused by gravity, and when the air pressure is turned on, such liquid will tend to be blown back into the cake. Also, if the liquid is removed from the trailing edge only, the accumulation of liquid in the lower end of the sector will be considerably greater. Thus, through the constructions of this invention, a dryer cake will be produced, due to the absence of blow-back of liquid into the cake.

Each pipe 24 is suitably secured to the hub in an air- and watertight manner, as by being pressed against a circular gasket 24' formed of suitable material, such as rubber. Each pipe 24 is also provided with a bracket 29, welded or secured thereto in any other suitable manner. The bracket extends chordally, i. e., perpendicular to a radius of the disc, and the block 26 is secured thereto in any suitable manner, as by screws. In addition, the block, which preferably is constructed of wood or other light material in which the grooves 27 can be readily formed, is screwed to pipe 24, by wood screws extending through the pipe and into the block.

The filtering cloth 19 preferably comprises a bag or the like which is slipped over the block 26 and the pipe 24, from the inner end thereof, to provide a filtering medium on both sides of each disc section. Each section includes a rod 30 screwed into a suitable threaded hole in hub 21, and each pipe 24 is forced against gasket 24' and held in position by a clamp 31 secured in place by a nut as shown, the clamp extending across from one block to the next. If desired, a retaining strip 32 of metal or the like, as in Fig. 4, may be clamped against the outer edge of the blocks to hold the bags more securely.

To replace a worn filter cloth, it is necessary only to loosen the clamps holding the particular section and remove pipe 24 and its associated block 26. The worn bag may then be removed and a new bag slipped over the pipe and block from the inner end, the outer edges of the bag being lapped and double-stitched. The pipe and block, with the new cloth, may then be replaced in the disc, and the clamps tightened. Of course, it will be customary to have on hand several replacement sections, so that when one section of cloth becomes worn, the pipe, block and cloth assembly may be replaced quickly, and with a minimum of interference with the operation of the filter. Worn cloths of removed assemblies may be replaced at leisure.

To supply pressure or vacuum influences to each disc, valve V may include a seat 34 and a cap 35, as in Fig. 2, the seat being attached to a trunnion 36 keyed to shaft 10 and rotatable in bearing 13'. The seat is provided with a plurality of ports 37, into which pipes 38 extend and are secured thereto in an air- and water-tight manner, as by threading, welding, or the like. Trunnion 36 is provided with a plurality of holes, corresponding to the number of pipes, to accommodate the same. The number of ports corresponds to the number of sections in the discs, there being eight in the apparatus as illustrated, but it will be understood that a different number of sections and ports may be used.

Valve cap 35 is provided with chambers 40 and 41, connected with vacuum hoses 15 and 16 respectively, and a similar chamber connected with air hose 17. These chambers are arcuate in shape, and extend around a sufficient portion of the circumference of a circle which coincides with a circle passing through the center line of ports 37, to cause the pressure and vacuum influences to be exerted through the ports for the desired periods of time. The radial extent of these chambers may be varied as desired, depending upon the time during which the various vacuum and pressure influences are to be produced in each disc section. For instance, the chamber 40 may extend through approximately 122°, the chamber 41 may extend through approximately 97°, and the chamber connected with air hose 17 may extend through approximately 76°. The remaining portion of the periphery of the circle is taken up by equal (or unequal if desired) partitions between the chambers, so that air will not be blowing into a vacuum chamber, or a lower vacuum detracting from a higher vacuum.

In each disc, the opposite sides of each hole 22 in hub 21 may be provided with a nipple 42 threaded thereinto, so that a pipe 43 may extend between the corresponding nipples of adjacent hubs, and a short section of pipe 44 may connect valve port pipes 38 with the first disc adjacent the valves. The ends of the holes 22 in the last disc are closed in a suitable manner, as by plugs 99 of Fig. 2. To prevent an accumulation of material around the shaft and between pipes 38, 43, etc., cover plates 45 extend between the hubs 21, and between the trunnion 36 and the hub adjacent thereto. The cover plates 45 may comprise two semi-circular sections, fastened together against a shoulder on each hub and on the trunnion 36, for ready installation and removal. In addition, to prevent collection of material or passage of fluent matter into bearing 13, a drip ring 46 may be attached to shaft 10 adjacent the bearing, and a similar drip ring may be provided adjacent trunnion 36.

The pipe sections connecting the valve with the hubs of the various discs, since they comprise relatively short sections and nipples screwed into the hubs, are interchangeable and are easily replaced. To replace one or more of the pipe sections, it is necessary only to remove the cover plate from the two hubs involved, unscrew the nipple from the first hub, then unscrew the nipple from the second hub, as in doing so the nipples will be forced into the pipe. The pipe and nipples may then be removed, and a new nipple, or pipe, or each, may be inserted. The pipes preferably have a close snug fit over each nipple so that they may be moved therealong by means of some force, but a substantially air and water tight connection is provided. Or, suitable packing may be provided.

The pipes 43, nipples 42, and also holes 22 are larger than the apertures 23 into which pipes 24 extend, so that each section will quickly receive the total vacuum or pressure effect. Also, due to the capacity of pipes 43 and the passage between all of the discs of which the pipes form a part, pressure and vacuum effects are relatively quickly felt through the discs, so that as each disc rotates and a section moves from the top downward on the descending side of the disc, each section will be drained effectively in the manner explained previously, and the filtrate or wash liquid will be quickly removed through pipe 24 and the passage of which pipes 43 form a part. Thus, after the deposited cake is removed by the scraping devices, and the section moves into the body of fluent matter, the vacuum effect will be quickly felt to its full effect as soon as port 37 corresponding to the section moves into juxtaposition with chamber 40.

The valve cap 35 is held tightly against the valve seat 34 by a compression spring within a cap 47, the spring being mounted on a stud attached to the end of shaft 10. A washer between the spring and the valve cap permits the spring to rotate with the shaft, and cap 47 prevents injury to personnel or unauthorized adjustment of or accident to the spring. Valve cap 35, of course, is stationary and may be prevented from rotating by being secured to the end of the tank in a suitable manner, as by a bar 48 which extends laterally therefrom and is attached to a rod 49 extending from the framework F, as in Fig. 1. It will be understood, of course, that the valve cap may be maintained stationary in any other suitable manner.

A scraping device is provided on each side of each disc, as in Fig. 1. The scraping devices are mounted on the sides of pans 18, extending rearwardly from the main section of the tank. The scraping devices may be constructed in any suitable manner, but the preferred construction, as in Figs. 1 and 2, includes an upwardly extending support 50 secured to the edge of pan 18 and at its end to a channel 51 which extends cross the ends of pans 18. Support 50 is inclined at an acute angle to the filtering surface, such as 30°; and its upper edge is also inclined upwardly from the inner to the outer end, along a radius of the disc. Support 50 is slightly longer than block 26, and provided along its upper edge with a pointed scraping member 52, adapted to dig underneath and thereby dislodge the deposited cake 53. Scraping member 52 is formed of a flexible resilient material to prevent, as much as possible, damage to and wear of filtering cloth 19. Preferably, the flexible resilient material of which member 51 is composed is rubber, either natural or synthetic, or other composition or substance of a similar nature.

Figure 5:
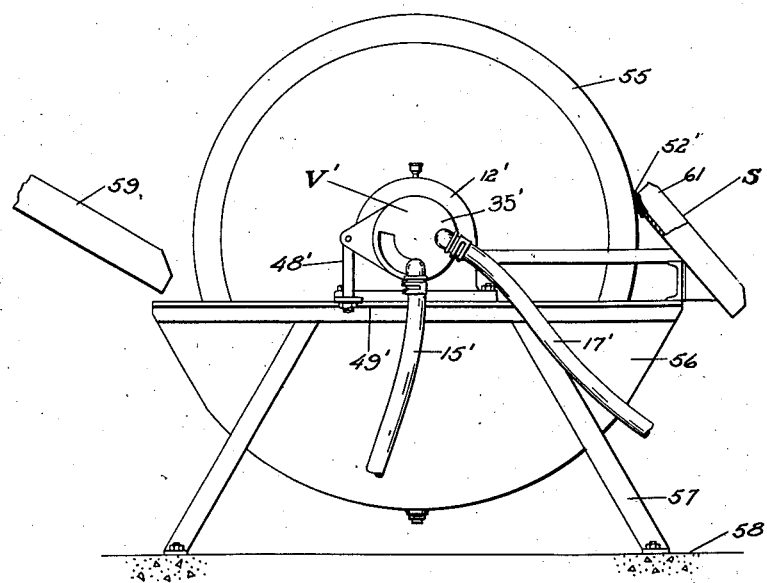
Fig. 5 is an end elevation of a drum-type filter, to which the principles of this invention may be applied.

The principles of this invention may be applied to a drum-type filter, as in Fig. 5, which may comprise a drum 55 rotatably mounted on the ends of a tank 56, in turn supported by a framework 57 mounted on a floor or foundation 58. Adjacent a bearing 12' for the shaft on which drum 55 is mounted, is a valve V' having vacuum and pressure connections to which a suction hose 15' and an air hose 17' lead. The cap 35' of valve V' is prevented from rotating by a bar 48', secured to a bracket 49'. Fluent matter is fed into the body thereof by an inlet 59, and solid matter is deposited on the peripheral surface of the drum 55 to form a cake thereon. The cake may be removed by a scraping device S', which includes a support 61 to which is attached a pointed scraping member 52', formed of rubber or rubber composition or the like, as before. The scraper extends the length of the drum, or may be formed in sections corresponding to lateral sections of the drum.

The periphery of the drum is divided into radial sections extending longitudinally thereof, and connections inside the drum (not shown) provide passages between the ports in valve V' and the respective drum sections. Suitable drainage means may be provided by a plurality of blocks having grooves therein similar to block 26, but preferably rectangular in outline and having a curved periphery corresponding to that of the drum. The grooves preferably extend parallel or at an angle to the sides of the drum, so as to obtain substantially the same angle of drainage as the grooves of one of the descending sections of the disc-type filter of Fig. 1. Slightly better drainage, of course, probably will be obtained by vertically extending grooves, i. e., grooves parallel to the sides of the drum, but better cloth wear probably will be obtained by grooves disposed at an angle thereto. Wear on the cloth threads is principally due to contact with the scraper, and should be less when the scraper contacts the cloth angularly across the threads.

The vacuum drainage and air pressure blow pipes, corresponding to pipes 24, preferably extend across the face of the drum, at the lower boundary of each section, considering the position of a section as it descends during rotation of the drum. The drainage action will be substantially as described previously, and the vacuum effect will be felt substantially instantly when turned on, so that when the section is submerged in the body of fluent matter, a readier and more even deposition of a deeper cake results, as previously.

From the foregoing, it is apparent that this invention provides improved results due to adequate drainage of each filter section; and sufficiently large passages between each disc and the valve ports, so that the maximum vacuum influence is produced during initial deposition of cake. In addition, this invention provides an improved disc-type filter provided with novel sections which are readily assembled and disassembled and in which the filter medium is readily replaceable. Also, such a disc-type filter is provided with improved connections between the valve and each disc.

Although specific embodiments of this invention have been described in detail, it will be understood that various changes may be made therein, and that the principles of this invention are applicable to other types of filters and similar apparatus without departing from the spirit and scope thereof.

What is claimed is:

1. In a filter, a circular disk secured to a rotatable axial member, said disk being built up of similar aligned segments each including an effluent conduit member extending radially from the axial member, an imperforate support of impervious material disposed in the plane of the conduit and secured thereto, said conduit projecting inwardly beyond the support into the axial member, the support having a plurality of straight parallel grooves formed therein substantially perpendicular to the conduit and communicating at one end only directly with perforations formed only through the trailing side of the conduit, the other end of the grooves being blocked to the passage of liquid and a filter medium enveloping the support and the portion of the conduit abutting the support.

2. In a filter, a section movable downwardly into, and upwardly out of, a body of fluent matter and comprising a filtering medium; impermeable means beneath said medium and provided with a plurality of straight, parallel grooves extending substantially perpendicularly to the boundary of said section which is lowermost as said section moves downwardly for draining fluid toward said lower boundary, the ends of the grooves nearest the lower boundary being open and the opposite ends being closed and means extending only along said lower boundary for removing such fluid, said means acting also as a support for said draining means.

3. In a filter which includes a tank for a body of fluent matter, a plurality of discs provided with filtering surfaces and rotatable about a substantially horizontal axis, a hub for each disc, and a plurality of radial sections for each disc and supported from said hub, the improvement which comprises means for draining substantially all the fluid passing through said filtering surface downwardly to the lower boundary of each section as said section moves downwardly during rotation of said disc, said means including straight, parallel channels disposed substantially perpendicularly to said lower boundry of each section and opening only along said lower boundary, said grooves closed near the upper boundary of the sector and an effluent conduit constituting the sole liquid discharge means from the section disposed near the leading edge thereof and communicating with said grooves.

4. In a filter, the improvement as defined in claim 3, and a support for each said draining means section, each said support extending radially from said hub and being provided with means for transmitting vacuum and pressure effects to spaced points beneath said filtering surface and along said lower boundary of said section.

5. A filter segment for use in a disk filter of the type wherein the disks are built up from a plurality of radial segments secured to an axial rotatable member, comprising a sector of substantially impermeable material having a series of grooves formed therein, said grooves being disposed to deliver liquid to the leading edge of the sector through an open end, the opposite end of the groove being blocked to prevent flow of liquid to the trailing edge of the sector a pipe having openings therein and comprising the leading edge of the sector, said pipe extending inwardly into fluid tight engagement with the axial member, a filter medium enveloping the sector and the portion of the pipe abutting the sector and clamping means for securing the pipe to the axial member, said pipe constituting the sole effluent conduit for the sector.

6. In a disc-type filter having at least one rotating disc movable into and out of a body of fluent matter, said disc comprising a plurality of segmental sections, each section including a radially extending pipe having apertures extending throughout a portion of its length along one side; a cloth support of impervious material mounted on said pipe and having grooves closed at one end and open at the end nearest said radially extending pipe providing spaces through which liquid may be drained to said pipe through the apertures; a bag of filtering cloth adapted to envelop said support so as to provide a filtering surface on each side of said disc, said bag being open at the outer end and otherwise closed except for an opening for said pipe at the inner end thereof; and means for clamping the outer ends of said bag against said support so as to complete the closing of said bag.

7. In a filter, a filtering section movable about a normal axis into and out of a body of fluent material, said section having an effluent conduit on the leading edge only, and an impervious imperforate segmental support portion having straight parallel grooves formed therein substantially perpendicular to the leading edge and communicating at one end only with the effluent conduit, the opposite end of the grooves being blocked to prevent discharge of liquid from the grooves to the trailing edge of the sector and a filter medium enveloping the said body portion and the portion of the effluent conduit abutting the body portion.

JOHN H. V. FINNEY.

REFERENCES CITED

The following references are of record in the file of this patent:

UNITED STATES PATENTS

| Number | Name | Date |
| --- | --- | --- |
| 1,030,918 | Peck | July 2, 1912 |
| 1,036,174 | Barnes | Aug. 20, 1912 |
| 1,042,295 | Trent | Oct. 22, 1912 |
| 1,208,014 | Robinson | Dec. 12, 1916 |
| 1,538,980 | Genter | May 26, 1925 |
| 1,812,725 | Stanley et al. | June 30, 1931 |
| 1,887,129 | Hirsch | Nov. 8, 1932 |
| 2,338,549 | Shriver et al. | Jan. 4, 1944 |
| 2,351,652 | Anderson | June 20, 1944 |
| 2,395,225 | Kurz | Feb. 19, 1946 |

FOREIGN PATENTS

| Number | Country | Date |
| --- | --- | --- |
| 12,162 | Great Britain | 1889 |
| 43,493 | France | Mar. 19, 1934 |
| 115,030 | Australia | Apr. 17, 1942 |
| 177,819 | Great Britain | Apr. 4, 1922 |
| 457,832 | Great Britain | Dec. 7, 1936 |